(12) United States Patent
Li et al.

(10) Patent No.: US 11,943,214 B2
(45) Date of Patent: Mar. 26, 2024

(54) IDENTITY RECOGNITION METHOD, APPARATUS, SYSTEM FOR AN OFFICE PLATFORM AND SERVER

(71) Applicant: Zhejiang Geely Holding Group Co., LTD., Hangzhou (CN)

(72) Inventors: Shufu Li, Hangzhou (CN); Guoxiang Ding, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 839 days.

(21) Appl. No.: 16/623,394

(22) PCT Filed: Jun. 14, 2018

(86) PCT No.: PCT/CN2018/091217
§ 371 (c)(1),
(2) Date: Dec. 16, 2019

(87) PCT Pub. No.: WO2018/228463
PCT Pub. Date: Dec. 20, 2018

(65) Prior Publication Data
US 2020/0177574 A1    Jun. 4, 2020

(30) Foreign Application Priority Data

Jun. 15, 2017 (CN) .......................... 201710453145.0

(51) Int. Cl.
*H04L 29/06* (2006.01)
*G06F 16/23* (2019.01)
*H04L 9/40* (2022.01)

(52) U.S. Cl.
CPC ........ *H04L 63/083* (2013.01); *G06F 16/2379* (2019.01)

(58) Field of Classification Search
None
See application file for complete search history.

(56) References Cited

U.S. PATENT DOCUMENTS 9,852,386 B2 * 12/2017 Solomon ................ G06Q 50/06
10,163,173 B1 * 12/2018 McKinley ............. G06F 3/0484
(Continued)

FOREIGN PATENT DOCUMENTS

| CN | 101159053 A | 4/2008 |
|---|---|---|
| CN | 102456103 A | 5/2012 |

(Continued)

*Primary Examiner* — Harunur Rashid
(74) *Attorney, Agent, or Firm* — Cheng-Ju Chiang

(57) ABSTRACT

The present disclosure provides an identity recognition method, including: receiving registration information of a first user; binding a first login password to a first account corresponding to a post; receiving a login request sent by a user terminal; and responding to the login request, and sending data information of the first account binding with a first login password to the user terminal, to make the user terminal display the data information. The present disclosure further provides an identity recognition apparatus, system and a server. According to the identity recognition method, apparatus, system and the server, an account is set to have a corresponding relationship with a post, thus a successor of the post can browse historical-data information of the account corresponding to the post through the login password. Thusly, the user experience is good.

8 Claims, 6 Drawing Sheets

(56) References Cited

U.S. PATENT DOCUMENTS

| | | | |
|---|---|---|---|
| 10,375,177 B1* | 8/2019 | Bretan | H04L 67/146 |
| 11,074,781 B2* | 7/2021 | Lutnick | G07F 17/3239 |
| 2006/0155636 A1* | 7/2006 | Hermann | G06Q 40/04 |
| | | | 705/37 |
| 2008/0294478 A1 | 11/2008 | Joshi et al. | |
| 2011/0270763 A1* | 11/2011 | Graham, III | G06Q 20/3829 |
| | | | 705/71 |
| 2013/0151064 A1* | 6/2013 | Becker | G07C 5/008 |
| | | | 701/31.4 |
| 2013/0346173 A1* | 12/2013 | Chandoor | G06Q 30/0601 |
| | | | 705/14.17 |
| 2014/0359734 A1 | 12/2014 | Natividad | |
| 2015/0324579 A1 | 11/2015 | Qian et al. | |
| 2018/0234416 A1* | 8/2018 | Moerk | H04L 63/08 |
| 2021/0014060 A1* | 1/2021 | Georgiadis | H04L 63/08 |

FOREIGN PATENT DOCUMENTS

| | | |
|---|---|---|
| CN | 102724221 A | 10/2012 |
| CN | 104919414 A | 9/2015 |
| CN | 105959268 A | 9/2016 |
| CN | 106056365 A | 10/2016 |
| CN | 106559381 A | 4/2017 |
| CN | 107181755 A | 9/2017 |
| JP | 2002-169986 A | 6/2002 |
| JP | 2005-228059 A | 8/2005 |
| JP | 2011-186675 A | 9/2011 |
| WO | 2010/078780 A1 | 7/2010 |

* cited by examiner

IDENTITY RECOGNITION METHOD, APPARATUS, SYSTEM FOR AN OFFICE PLATFORM AND SERVER

CROSS REFERENCE TO RELATED APPLICATION

The present application is based on and claims priority of Chinese patent application No. 201710453145.0, filed on Jun. 15, 2017. The entire disclosure of the above-identified application is hereby incorporated by reference herein and made a part of this specification.

FIELD OF THE INVENTION

The present disclosure relates to the field of communications technologies, and more particularly to an identity recognition method, an identity recognition apparatus, an identity recognition system for an office platform and a server.

BACKGROUND OF THE INVENTION

Nowadays, more and more enterprises provide employees with enterprise an office platform such as mail systems, process systems and social systems, to realize information transfer between employees and paperless office. The enterprise an office platform can enhance work efficiency while strengthening a company's information security management. In addition, as all of the company's internal information can only be passed on the enterprise an office platform, using the enterprise an office platform can also ensure that the internal information of the company will not be transferred to outside.

But most of existing enterprise an office platform distributes a personal account according to a number of an employee, each employee uses their own accounts to send mail, audit processes, and social activities within the company. A predecessor of a post needs to hand over all work information to a successor when the employee leaves or transfers an original post, but the successor cannot browse previous work according to an existing enterprise an office platform, which may cause the successor pick up slowly, and important information may be forgotten or missing at the time of handover, which is likely to lead to problem that the successor can not be qualified for a new post quickly.

SUMMARY OF THE INVENTION

Technical Solution

Therefore, the present disclosure provides an identity recognition method, which may make a successor can browse historical-data information of a predecessor, to make the user experience good.

The present disclosure provides an identity recognition method, wherein the identity recognition method is applied to a server and includes: receiving registration information of a first user, wherein the registration information includes an identification of a post of the first user, an identity of the first user and a first login password; binding the first login password to a first account corresponding to the post; receiving a login request sent by a user terminal, wherein the login request includes the first login password; and responding to the login request, and sending data information of the first account binding with the first login password to the user terminal, to make the user terminal display the data information.

The present disclosure provides an identity recognition method, wherein the identity recognition method is applied to a server and a user terminal, includes: the user terminal sending registration information of a first user, wherein the registration information includes an identification of a post of the first user, an identity of the first user and a first login password; the server binding the first login password to a first account corresponding to the post; the user terminal sending a login request to the server, wherein the login request including the first login password; the server responding to the login request, and sending data information of the first account binding with the first login password to the user terminal; the user terminal displaying the data information.

The present disclosure also provides an identity recognition apparatus, includes: a first receiving module, being configured to receive registration information of a first user, wherein the registration information includes an identification of a post of the first user, an identity of the first user and a first login password; a first binding module, being configured to bind the first login password to a first account corresponding to the post; a second receiving module, being configured to receive a login request sent by a user terminal, wherein the login request including the first login password; a first sending module, being configured to response the login request, and send data information of the first account binding with the first login password to the user terminal, to make the user terminal display the data information.

The present disclosure also provides an identity recognition system, includes said identity recognition apparatus.

The present disclosure also provides an identity recognition system, wherein the identity recognition system includes a server, wherein the server includes: a processor; and a memory communicatively coupled to the processor and storing instructions that upon execution by the processor cause the server terminal to: receiving registration information of a first user, wherein the registration information comprises an identification of a post of the first user, an identity of the first user and a first login password; binding the first login password to a first account corresponding to the post; receiving a login request sent by a user terminal, wherein the login request comprises the first login password; and responding to the login request, and sending data information of the first account binding with the first login password to the user terminal, to make the user terminal display the data information.

The present disclosure also provides an server, wherein the server includes a processor, and a memory communicatively coupled to the processor and storing instructions that upon execution by the processor cause the server terminal to: receiving registration information of a first user, wherein the registration information comprises an identification of a post of the first user, an identity of the first user and a first login password; binding the first login password to a first account corresponding to the post; receiving a login request sent by a user terminal, wherein the login request comprises the first login password; and responding to the login request, and sending data information of the first account binding with the first login password to the user terminal, to make the user terminal display the data information.

According to the identity recognition method, apparatus, system and the server of the present disclosure, the first account is corresponding to the post, thus when the login password set by a successor of the post is bound to the first account corresponding to the post, the successor can browse historical-data information corresponding to the first account through the login password. Thusly, the user experience is good.

In order to further elucidate the technical means and efficacy of the present disclosure for achieving the intended purpose of the disclosure, the present disclosure will be described in more detail with reference to the accompanying drawings and preferred embodiments as follow.

DETAILED DESCRIPTION OF PREFERRED EMBODIMENTS

BEST MODE

In order to further elucidate the technical means and efficacy of the present disclosure for achieving the intended purpose of the disclosure, the present disclosure will be described in more detail with reference to the accompanying drawings and preferred embodiments as follow.

Figure 1:
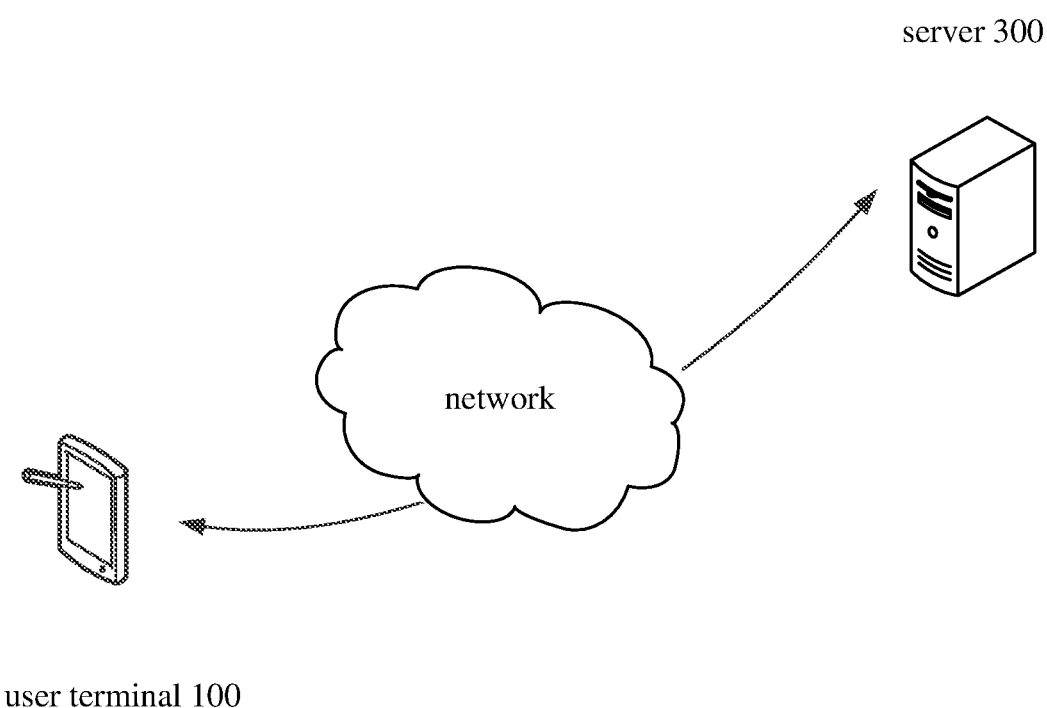
FIG. 1 is a schematic view of a first embodiment of an application environment of an identity recognition method of the present disclosure.

The identity recognition method for an office platform provided by various embodiments of the present invention may be applied in an application environment as shown in FIG. 1, to implement identity recognition. As shown in FIG. 1, the application environment includes a user terminal 100 and a server 300. The user terminal 100 and the server 300 are located in a wireless network or a wired network, and the user terminal 100 and the server 300 exchange data mutually through the wireless network or the wired network.

Among them, the user terminal 100 may be a computer terminal device such as a personal computer (PC), an all-in-one computer, a laptop portable computer, or a mobile terminal device such as a vehicle terminal, and a smart phone, a smart TV, a TV box, a tablet computer, and an e-book reader, a MP3 player (Moving Picture Experts Group Audio Layer III), a MP4 (Moving Picture Experts Group Audio Layer IV).

The server 300 may be a server, or a server cluster composed of several servers, or a cloud computing service center.

Figure 2:
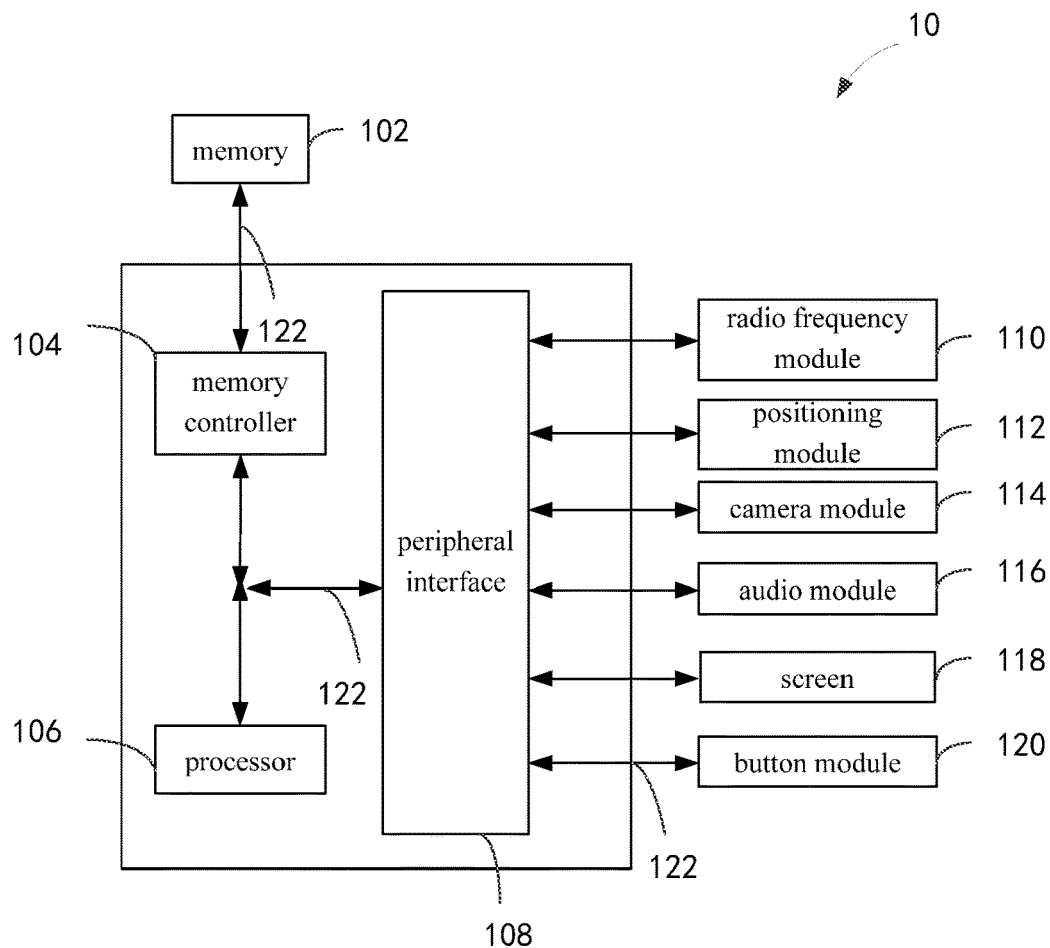
FIG. 2 is a diagram illustrating of a terminal of the present disclosure.

FIG. 2 is a diagram illustrating of a terminal of the present disclosure. The structure shown in FIG. 2 can be applied to the user terminal 100. As shown in FIG. 2, the terminal 10 includes a memory 102, a memory controller 104, one or more (only one shown in the FIG. 2) processor 106, a peripheral interface 108, a radio frequency module 110, a positioning module 112, and a camera module 114, an audio module 116, a screen 118, and a button module 120. These components communicate with each another via one or more communication buses/signal lines 122.

It can be understood that the structure shown in FIG. 2 is only an illustration, and the terminal 10 may further include more or less components than those shown in FIG. 2, or have a different configuration from that shown in FIG. 2. The components shown in FIG. 2 may be implemented using hardware, software or a combination thereof.

The memory 102 may be used to store software programs and modules, such as program instructions/modules corresponding to the identity recognition method and system for the office platform in an embodiment of the present invention. The processor 106 runs software programs and modules stored in the memory controller 104, to execute various functional applications and data processing, to implement the above-mentioned identity recognition method and system for the office platform.

The memory 102 may include a high-speed random access memory, and may also include a non-volatile memory such as one or more magnetic storage devices, flash memory, or other non-volatile solid-state memory. In some embodiments, the memory 102 can further include remote memories set with the processor 106 remotely. These remote memories can be connected to the terminal 10 through a network. The above network includes, but not limited to, Internet, intranet, LAN, mobile communication network and their combination. The processor 106 and other possible components access to memory 102 can be controlled under the storage controller 104.

The peripheral interface 108 couples various input/output devices to the CPU and the memory 102. The processor 106 executes various software and instructions within the memory 102 to execute various functions of the terminal 10 and perform data processing.

In some embodiments, the peripherals interface 108, the processor 106, and the memory controller 104 may be implemented in a single chip. In other embodiments, they can be implemented by separate chips.

The radio frequency module 110 is used for receiving and transmitting electromagnetic waves, and realizes the mutual conversion of electromagnetic waves and electric signals so as to communicate with a communication network or other devices. The radio frequency module 110 may include various existing circuit elements for performing these functions, such as antennas, radio frequency transceivers, digital signal processors, encryption/decryption chips, subscriber identity module (SIM) cards, memory, etc. The radio frequency module 110 can communicate with various networks such as the Internet, corporate intranets, and wireless networks, or communicate with other devices through a wireless network. The above wireless network may include a cellular telephone network, a wireless local area network, or a metropolitan area network. The above wireless network may use various communication standards, protocols and technologies, including but not limited to Global System for Mobile Communication (GSM), Enhanced Data GSM Environment (EDGE), and Wideband Code. Wideband code division multiple access (W-CDMA), Code division access (CDMA), Time division multiple access (TDMA), Bluetooth, Wireless fidelity (Wireless) , Fidelity, WiFi) (e.g., IEEE 802.11a, IEEE 802.11b, IEEE 802.11g, and/or IEEE 802.11n), Voice over Internet Protocol (VoIP), and Worldwide Interoperability for Microwave Access (Worldwide Interoperability for Microwave Access (Wi-Max), other protocols for e-mail, instant messaging, and SMS, and any other suitable communication protocol, may even include those that are currently not yet developed.

The positioning module 112 is configured to acquire current position of the terminal 10. Examples of positioning module 112 include, but are not limited to, global positioning system (GPS), wireless local area network or mobile communication network based positioning technology.

The camera module 114 is used to take photos or videos. A captured photo or video may be stored in the memory 102 and may be transmitted through the radio frequency module 110.

The audio module 116 provides a user with an audio interface that may include one or more microphones, one or more speakers, and an audio circuit. The audio circuit receives sound data from the peripheral interface 108, converts the sound data into electrical information, and transmits the electrical information to the speaker. The speakers convert the electrical information into sound waves that human ear can hear. The audio circuit also receives electrical information from the microphone, converts the electrical signal to voice data, and transmits the voice data to the peripheral interface 108 for further processing. Audio data may be obtained from the memory 102 or through the radio frequency module 110. In addition, the audio data may also be stored in the memory 102 or transmitted through the RF module 110. In some embodiments, the audio module 116 may also include a headphone jack for providing an audio interface to a headset or other device.

The screen 118 provides an output interface between terminal 10 and the user. Specifically, the screen 118 displays video output to the user. The content of the video output may include text, graphics, video, and any combination thereof. Some output results correspond to some user interface objects. As can be appreciated, the screen 118 can also include a touch screen. The touch screen simultaneously provides an output and input interface between the terminal 10 and the user. In addition to displaying video output to the user, the touch screen also receives user input such as user's gestures such as clicking and swiping, so that the user interface object responds to the user's input. The technology for detecting the user input can be based on resistive, capacitive, or any other possible touch detection technology. Specific examples of touch screen display units include but are not limited to liquid crystal displays or light emitting polymer displays.

The button module 120 also provides an interface for the user to input to the terminal 10, and the user can press different buttons to make the terminal 10 perform different functions.

Figure 3:
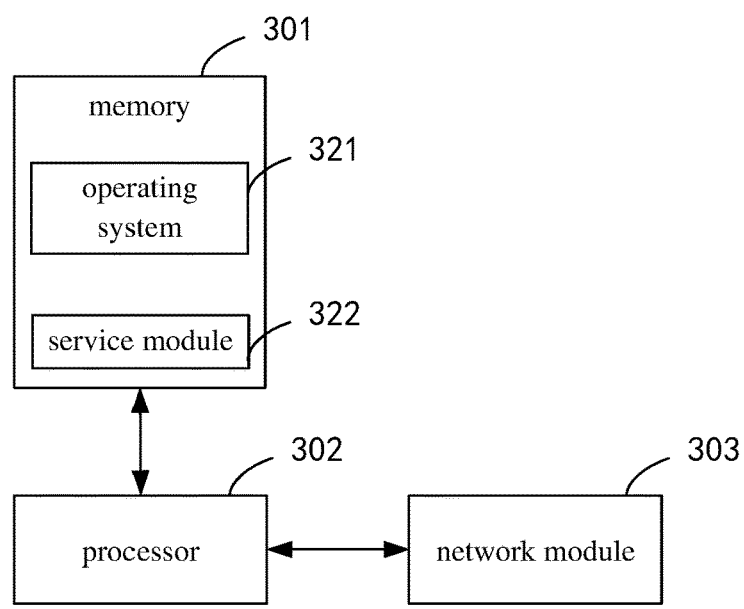
FIG. 3 is a diagram illustrating of a server of the present disclosure.

FIG. 3 is a diagram illustrating of a server of the present disclosure. As shown in FIG. 3, the server includes: a memory 301, a processor 302, and a network module 303.

It can be understood that the structure shown in FIG. 3 is only an illustration, and the server may also include more or fewer components than those shown in FIG. 3, or have a different configuration from that shown in FIG. 3. The components shown in FIG. 3 may be implemented using hardware, software, or a combination thereof. In addition, the server in the embodiment of the present invention may also include a plurality of servers with different specific functions.

The memory 301 may be used to store software programs and modules, such as program instructions/modules corresponding to the identity recognition method and system for the office platform in an embodiment of the present invention. The processor 302 runs software programs and modules stored in the memory 301, to execute various functional applications and data processing, i.e., to implement the above-mentioned identity recognition method and system for the office platform. The memory 301 may include a high-speed random access memory, and may also include a non-volatile memory such as one or more magnetic storage devices, flash memory, or other non-volatile solid-state memory. In some embodiments, the memory 301 can further include remote memories set with the processor 302 remotely. These remote memories can be connected to the server through a network. Further, the above software program and module may further include: an operating system 321 and a service module 322. The operating system 321, for example, may be LINUX, UNIX, WINDOWS, which may include various software components and/or drivers for managing system tasks (e.g., memory management, storage device control, power management, etc.), and may be communicate with Hardware or software components, to provide the operating environment for other software components. The service module 322 runs on the basis of the operating system 321, and listens for requests from the network through the network service of the operating system 321, completes corresponding data processing according to the request, and returns processing results to the terminal. That is, the service module 322 is used to provide network services to the terminal.

The network module 303 is used to receive and send network signals. The above network signal may include a wireless signal or a wired signal. In one embodiment, the above network signal is a wired network signal. At this time, the network module 303 may include elements such as a processor, a random access memory, a converter, a crystal oscillator, and so on.

A First Embodiment

Figure 4:
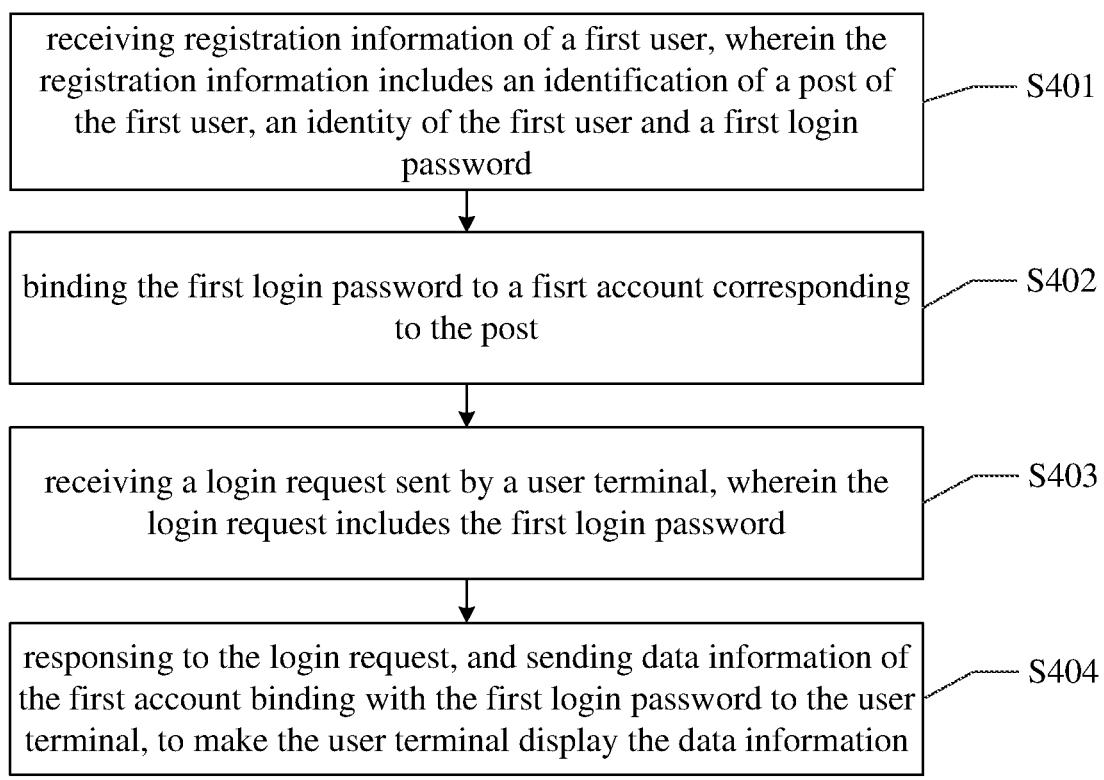
FIG. 4 is a schematic process view of a first embodiment of an identity recognition method of the present disclosure.

FIG. 4 is a schematic process view of a first embodiment of an identity recognition method of the present disclosure. This embodiment may be identity recognition method for the office platform performed by the server 300 through the network. The office platform may be, but not limited to an integrated platform including a mailbox system, an approval flow system, and a social platform system, but the invention is not limited thereto. As shown in FIG. 4, the identity recognition method for the office platform in this embodiment may include the following steps:

step S401: receiving registration information of a first user, wherein the registration information includes an identification of a post of the first user, an identity of the first user and a first login password;

Specifically, the post may, but not limited to, includes both authority and responsibilities. Users with a same post have a same responsibilities and authorities.

Specifically, the identification of the post may be, but is not limited to a title such as a manager, a leader, etc., but may also be, but not limited to, a unique identification that can identify the identification of the post of the first user, such as a combination of a title and a character, such as a first manager, a first leader, etc. The identity of the first user may be the identification of the post of the first user, and may also include a unique identification that can identify the identity of the first user, such as at least one of the first user's identification number, name, and phone number, and so on.

step S402: binding the first login password to a first account corresponding to the post;

step S403: receiving a login request sent by a user terminal, wherein the login request includes the first login password;

Specifically, in one embodiment, it may, but not limited to regard the identification of the post of the first user as the identification of the first account, so that, the login request may, but not limited to further include the identification of the post of the first user. Of course, when there is a binding relationship between the identity of the first user and the identification of the first account, the identification of the first account may be, but also not limited to the identity of the first user such as name, phone number, identification number, etc. Therefore the login request may also, but is not limited to include the identity of the first user such as the name, the phone number, the identification number, and so on.

step S404: responding to the login request, and sending data information of the first account binding with the first login password to the user terminal, to make the user terminal display the data information.

Specifically, the data information of the first account is information stored in the first database corresponding to the first account. The data information may, but not limited to, include operation information about contents of the first account, such as an editing operation, a favorite operation, and/or the like, and/or interaction information between the first account and other accounts, and so on.

Specifically, the identity recognition method may, but not limited to include: sending share-data information of an associated account of the first account to the user terminal, when receiving a read request. The read request includes an identification of the first account. Wherein the associated account of the first account may, but is not limited to, include a system-default account, and a post corresponding to the system-default account with the post corresponding to the first account belong to a same post type, for example, it may, but may not be limited to define some or all posts in a same department belong to the same post type. The associated account of the first account may also include an account that response to the first account after receiving an association request.

Wherein, the share-data information that sent to the first account of the user terminal is stored in a shared database, for example, accounts associated of the first account include an A account and a B account, and then the share-data information of the first account, the A account, and the B account are stored in the shared database. Each of the first account, the A account, and the B account can obtain the share-data information in the shared database by sending the read request.

Wherein, the share-data information that sent to the first account of the user terminal may, but not limited to include some documents edited and/or sent and/or received by a system-default-associated account, and/or some data information sent by the associated account to a shared account or a designated account. Format of the documents may be excel, and so on.

According to the identity recognition method of the present disclosure, the first account is corresponding to the post, thus when the login password set by a post successor is bound to the first account corresponding to the post, the successor of the post can browse historical-data information corresponding to the first account through the login password. Thusly, the user experience is good.

A Second Embodiment

Figure 5:
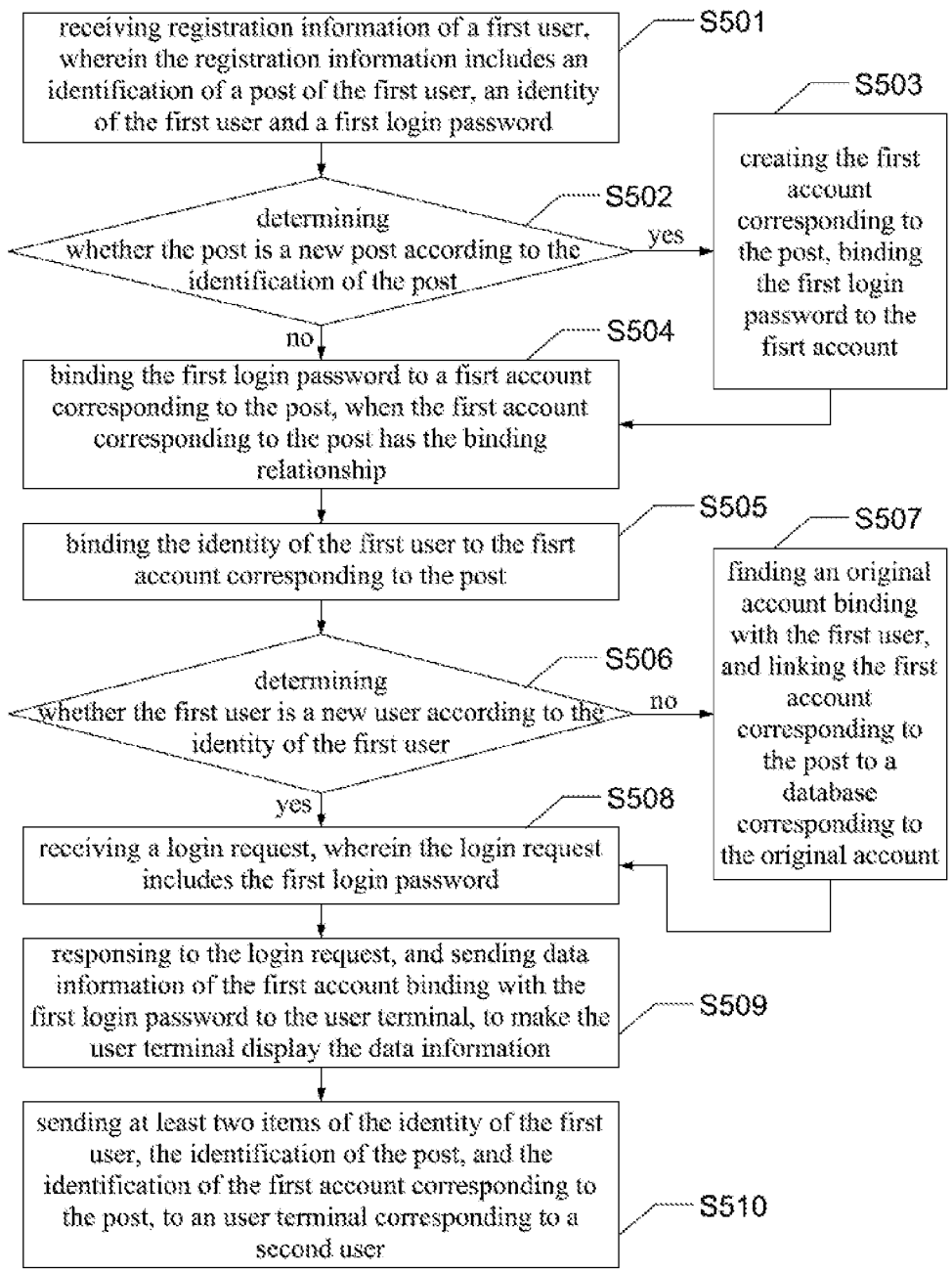
FIG. 5 is a schematic process view of a second embodiment of an identity recognition method of the present disclosure.

FIG. 5 is a schematic process view of a second embodiment of the identity recognition method of the present disclosure. This embodiment may be identity recognition method for the office platform performed by the server 300 through the network. The office platform may be, but not limited to an integrated platform including a mailbox system, an approval flow system, and a social platform system. But the disclosure is not limited thereto, the office platform also can include a third-party-social platform, and so on. When the office platform is the integrated platform, the login password can, but not limited to be used to login all system of the office platform. Wherein, one account of the office platform is corresponding to one post. Property information of each post can be, but not limited to included: an identification of the post, a fixed telephone number of a post manager, a job template corresponding to the post, responsibilities of the post, organizational relationship of the post, annual task of the post, and so on. It can, but not limited to, send the property information to a user terminal corresponding to an account when an user login the office platform through a login password, so as to facilitate the user to understand properties of the post.

As shown in FIG. 5, the identity recognition method for the office platform in this embodiment may include the following steps:

step S501: receiving registration information of a first user, wherein the registration information includes an identification of a post of the first user, an identity of the first user and a first login password;

Specifically, the post may, but not limited to, include both authority and responsibilities. Users with a same post have a same responsibilities and authorities.

Specifically, the identification of the post may be, but is not limited to a title such as a manager, a leader, etc., but may also be, but not limited to, a unique identification that can identify the identification of the post of the first user, such as a combination of a title and a character, such as a first manager, a first leader, etc. The identity of the first user may be the identification of the post of the first user, and may also include a unique identification that can identify the identity of the first user, such as at least one of the first user's identification number, name, and phone number, and so on.

In one embodiment, the registration information of the first user may also, but not limited to include other property information of the first user such as the first user's gender, the first user's home address, the first user's emergency contact, the first user's third-party-social account, and so on, beside the identity of the first user.

step S504: binding the first login password to a first account corresponding to the post;

Specifically, before execute the step of S504: binding the first login password to a first account corresponding to the post, the identity recognition method includes step S502: determining whether the post is a new post according to the identification of the post;

if the post is a new post, enter in step S503: creating the first account corresponding to the post, binding the first login password to the first account;

if the post is not a new post, enter in the step S504 directly: binding the first login password to the first account.

In one embodiment, if the post is not a new post, the first user is a successor of the post, so it can make an original login password unbind from the first account automatically, and enter into the step 5504 directly: binding the first login password to a first account corresponding to the post, when the first account corresponding to the post has a binding relationship. Of course, it can, but not limited to make the original login password unbind from the first account when receiving an unbinding request, and then entered in step 5504: binding the first login password to a first account corresponding to the post, when the first account corresponding to the post has the binding relationship. Of course, the present disclosure is not limited to it, and it can also allow the first account to bind to both the original login password and the first login password within a preset time such as a month.

Specifically, it may, but not limited to save all of data information stored in a database corresponding to the first account, when receiving the unbinding request including the original login password. It also may, but not be limited to, remove part of the data information stored in the database automatically, such as the data information corresponding to the third-party-social platform, and so on. The present disclose is not limited to this.

In one embodiment, before enter in the step S504: binding the first login password to a first account corresponding to the post, the identity recognition method may further include:

sending an approval request for the registration information to a user terminal corresponding to an upper account of the first account; and receiving an approval information send by the user terminal corresponding to the upper account of the first account.

Wherein a post corresponding to the upper account is an upper of the post corresponding to the first account, for example, if the post corresponding to the first account is an engineer of a first group, then the post corresponding to the upper account may be a leader of the first group, such as a manager of the first group, etc. Of course, the upper account may also be a management account of human resources, etc.

In one embodiment, the identity recognition method for the office platform may, but not limited to further include:

step S505: binding the identity of the first user to the first account corresponding to the post;

Specifically, the identity of the first user may, but is not limited to include at least one of a unique identification that can identify the identity of the first user, such as the first user's identification number, name, and phone number.

It should be noted that, sequence of step S504 and step S505 is not limited to this. It may bind the identity of the first user with the first account corresponding to the post first, and then bind the first login password with the first account. It may also that binding the identity of the first user and the first login password with the first account corresponding to the post first simultaneously.

In one embodiment, the identity recognition method for the office platform may, but not limited to further include:

step S506: determining whether the first user is a new user according to the identity of the first user;

if the first user is not a new user, enter in step S507: finding an original account binding with the first user, and linking the first account corresponding to the post to a database corresponding to the original account.

Specifically, after the first account linked to the original account, the first user may operate such as access and/or edit all of data information or partial of information of a database corresponding to the original account through the first account. In one embodiment, the first user may have access rights and/or edit permissions such as replicating, forwarding, etc., for all of the data information in the database of the original account, or only have operate rights for the data information within a certain period of time.

step S508: receiving a login request, wherein the login request includes the first login password.

Specifically, in one embodiment, it may, but not limited to regard the identification of the post of the first user as the identification of the first account, so that, the login request may, but not limited to further include the identification of the post of the first user. Of course, when there is a binding relationship between the identity of the first user and the identification of the first account, the identification of the first account may be, but also not limited to the identity of the first user such as name, phone number, identification number, etc. Therefore the login request may also, but is not limited to include the identity of the first user such as the name, the phone number, the identification number, and so on.

step S509: responding to the login request, and sending data information of the first account binding with the first login password to the user terminal, to make the user terminal display the data information.

Specifically, the data information of the first account is information stored in the first database corresponding to the first account. The data information may, but not limited to, include operation information about contents of the first account, such as an editing operation, a favorite operation, and/or the like, and/or interaction information between the first account and other accounts, and so on.

In one embodiment, the identity recognition method for the office platform in this embodiment may, but not limited to include the following steps:

step S510: sending at least two items of the identity of the first user, the identification of the post, and the identification of the first account corresponding to the post, to a user terminal corresponding to a second user.

In one embodiment, step S510 can, but not limited to include send the identity of the first user and other property information of the first user, such as at least one item of the gender of the first user and the age of the first user to the user terminal corresponding to the second user. In addition, it may be, but not limited to, send at least one item of the identification of the post and other property information of the post, such as a fixed telephone number of the post manager, responsibilities of the post, and organizational relationship, to the user terminal corresponding to the second user.

Among them, the second user can be, but not limited to, the in-service employees who have registered on the office platform and saved in a communication record of the office platform, or customers stored in the communication record of the office platform, etc.

If the first user is a new user, can enter in the step of S508 directly: receiving a login request, wherein the login request includes the first login password, or enter in other following steps such as the step S510: sending at least two items of the identity of the first user, the identification of the post, the identification of the first account corresponding to the post to a user terminal corresponding to a second user directly.

In one embodiment, the identity recognition method for the office platform in this embodiment may, but not limited to include the following steps:

receiving an unbind request, wherein the unbind request includes an identity of a former user;

finding a second account binding to the former user according to the identity of the former user, and unbinding the second account to the former user.

Among them, former users refer to those who no longer hold the same post, such as those who have been promoted or resigned, etc.

According to the identity recognition method of the present disclosure, the first account is corresponding to the post, thus when the login password set by the successor of the post is bound to the first account corresponding to the post, the successor of the post can browse historical-data information corresponding to the first account through the login password. Thusly, the user experience is good.

Third Embodiment

Figure 6:
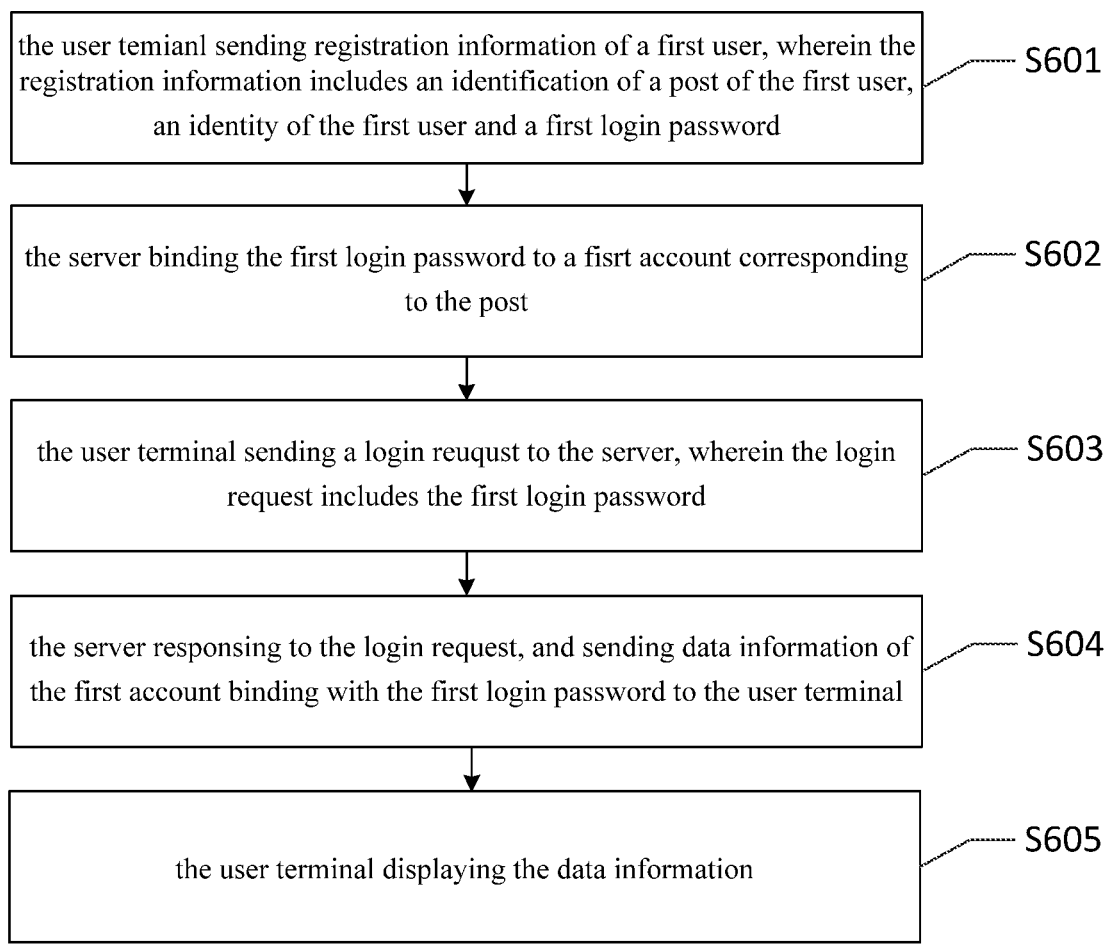
FIG. 6 is a schematic process view of a third embodiment of an identity recognition method of the present disclosure.

FIG. 6 is a schematic process view of a third embodiment of the identity recognition method of the present disclosure. The identity recognition method for the office platform provided by the third embodiments of the present invention may be applied between the user terminal 100 and the server 300 as shown in FIG. 1. In the embodiment, the identity recognition method for the office platform includes following steps:

step S601: the user terminal sending registration information of a first user, wherein the registration information includes an identification of a post of the first user, an identity of the first user and a first login password;

step S602: the server binding the first login password to a first account corresponding to the post;

step S603: the user terminal sending a login request to the server, wherein the login request includes the first login password;

step S604: the server responding to the login request, and sending data information of the first account binding with the first login password to the user terminal;

step S605: the user terminal displaying the data information.

In one embodiment, the step S602: the server binding the first login password to a first account corresponding to the post includes:

determining whether the post is a new post according to the identification of the post;

If the post is a new post, creating the first account corresponding to the post, binding the first login password to the first account;

if the post is not a new post, enter in the step of the server binding the first login password to the first account directly.

In one embodiment, the step S602: the server binding the first login password to a first account corresponding to the post further includes:

the server binding the identity of the first user to the first account corresponding to the post.

In one embodiment, the identity recognition method may, but not limited to further includes:

the server determining whether the first user is a new user according to the identity of the first user;

if the first user is not a new user, the server finding an original account binding with the first user, and linking the first account corresponding to the post to a database corresponding to the original account;

sending at least two items of the identity of the first user, the identification of the post, the identification of the first account corresponding to the post, to a user terminal corresponding to a second user directly;

If the first user is a new user, enter in the step of sending at least two items of the identity of the first user, the identification of the post, the identification of the first account corresponding to the post to a user terminal corresponding to a second user directly.

According to the identity recognition method of the present disclosure, the first account is corresponding to the post, thus when the login password set by a post successor is bound to the first account corresponding to the post, the successor of the post can browse historical-data information corresponding to the first account through the login password. Thusly, the user experience is good.

Fourth Embodiment

Figure 7:
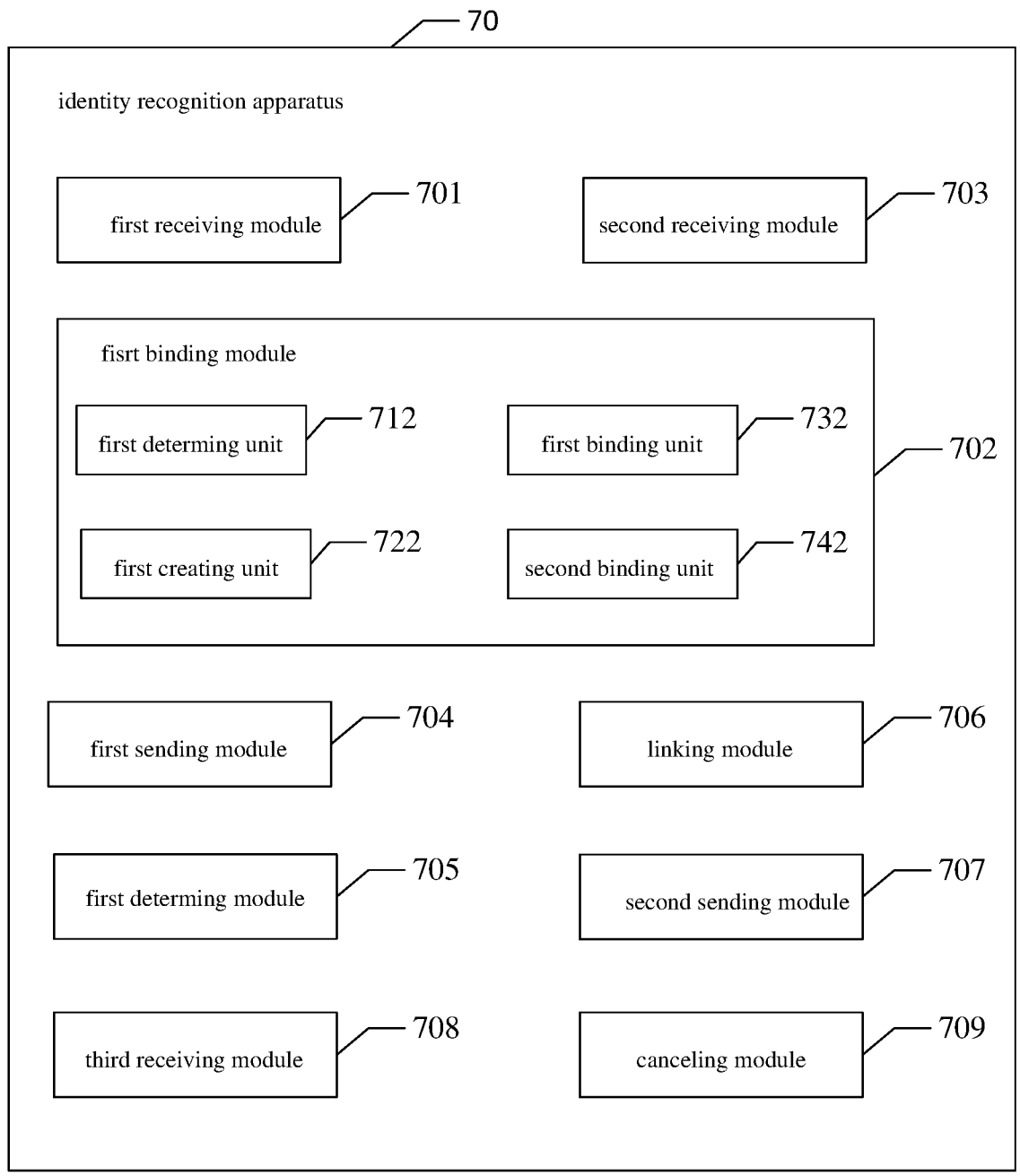
FIG. 7 is a schematic structural view of a fourth embodiment of an identity recognition apparatus of the present disclosure.

FIG. 7 is a schematic structural view of a fourth embodiment of an identity recognition apparatus 70 of the present disclosure. As shown in FIG. 7, the identity recognition apparatus 70 includes a first receiving module 701, a first binding module 702, a second receiving module 703, a first sending module 704. The first receiving module is configured to receive registration information of a first user. The registration information includes an identification of a post of the first user, an identity of the first user and a first login password. The first binding module 702 is configured to bind the first login password to a first account corresponding to the post. The second receiving module 703 is configured to receive a login request sent by a user terminal, wherein the login request comprises the first login password. The first sending module 704 is configured to response the login request, and sent data information of the first account binding with the first login password to the user terminal, to make the user terminal display the data information.

In one embodiment, the first sending module 704 is being further configured to send share-data information of an associated account of the first account to the user terminal when receiving a read request. Wherein, the read request includes an identification of the first account. Among them, the associated account of the first account may include, but is not limited to, a system default account that of which post with post corresponding to the first account belong to the same post type, for example, but may not be limited to the definition of some or all posts in the same department belong to the same post type. The associated account of the first account may also include an account that receives a response after sends an association request to the first account.

Wherein, the share-data information that sent to the first account of the user terminal is stored in a shared database, for example, accounts associated of the first account include an A account and a B account, and then the share-data information of the first account, the A account, and the B account are stored in the shared database. Each of the first account, the A account, and the B account can obtain the share-data information in the shared database by sending the read request.

Wherein, the share-data information that sent to the first account of the user terminal may, but not limited to include some documents edited and/or sent and/or received by a system-default-associated account, and/or some data information sent by the associated account to a shared account or a designated account. Format of the documents may be excel, and so on.

Wherein, the first binding module 702 includes a first determination unit 712, a first creating unit 722, a first binding unit 732. The first determination unit 712 is configured to determining whether the post is a new post according to the identification of the post. The first creating unit 722 is configured to create the first account corresponding to the post when the post is a new post. The first binding unit 732 is configured to bind the first login password to the first account.

Wherein, the first binding module 702 further includes a second binding unit 742. The second binding unit 742 is configured to bind the identity of the first user to the first account corresponding to the post.

Wherein, the identity recognition apparatus 70 further includes a first determination module 705 and a linking module 706. The first determination module is configured to determine whether the first user is a new user according to the identity of the first user. the linking module 706 is configured to find an original account binding with the first user, and link the first account corresponding to the post to a database corresponding to the original account when the first user is not a new user.

Wherein, the identity recognition apparatus 70 further includes a second sending module 707. The second sending module 707 is configured to sending at least two items of the identity of the first user, the identification of the post, the identification of the first account corresponding to the post to a user terminal corresponding to a second user.

Wherein, the identity recognition apparatus 70 further includes a third receiving module 708 and a first canceling module 709. The third receiving module 708 is configured to receive an unbind request, wherein the unbind request includes an identity of a former user. The first canceling module 709 is configured to find a second account binding to the former user according to the identity of the former user, and unbind the second account to the former user.

An identity recognition system of the present disclose includes the identity recognition apparatus. The identity recognition apparatus includes a first receiving module, a first binding module, a second receiving module, a first sending module. The first receiving module is configured to receive registration information of a first user. The registration information includes an identification of a post of the first user, an identity of the first user and a first login password. The first binding module is configured to bind the first login password to a first account corresponding to the post. The second receiving module is configured to receive a login request sent by a user terminal, wherein the login request includes the first login password. The first sending module is configured to response the login request, and sent data information of the first account binding with the first login password to the user terminal, to make the user terminal display the data information.

According to the identity recognition method, apparatus, system and server of the present disclosure, the first account is corresponding to the post, thus when the login password set by a post successor is bound to the first account corresponding to the post, the successor of the post can browse historical-data information corresponding to the first account through the login password. Thusly, the user experience is good.

It should be noted that the embodiments in the specification are described in a progressive manner. The description of any embodiment focuses on the difference compared with other embodiments. The same or similar elements of the respective embodiments may refer to each other. The embodiments of the devices and the embodiments of the corresponding method may refer to each other, so as to omit the duplicated description.

It should be noted that the relational terms herein such as first and second are used only to differentiate one entity or operation from another entity or operation, and do not require or imply any actual relationship or sequence between these entities or operations. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be executed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The ordinary person skilled in the art can understand that all or part of the steps in the above method can be completed by a hardware or be completed by a program instructing related hardware, and the program can be stored in a computer readable memory medium, such as a read-only memory, disk or optical disk and so on.

The above are merely the preferred embodiments of the present invention and are not intended to limit the present invention in any form. Although the present invention has been disclosed by the preferred embodiments as mentioned above, the preferred embodiments are not used for limiting the present invention. Many possible variations and modifications may be made to the technical solutions of the present invention, or the technical solutions of the present invention may be modified into equivalent embodiments changed equivalently, without departing from the scope of the technical solutions of the present invention by any person skilled in the art by using the methods and technical contents as disclosed above. Therefore, any simple modifications, equivalent changes and modifications made to the embodiments above according to the technical essence of the present invention without departing from the contents of the technical solutions of the present invention shall belong to the scope of protection of the technical solutions of the present invention.

What is claimed is:

1. An identity recognition method for an office platform, wherein the identity recognition method is applied to a server, and the identity recognition method comprises:

receiving registration information of a first user, wherein the registration information comprises an identification of a post of the first user, an identity of the first user and a first login password;

binding the first login password to a first account corresponding to the post;

receiving a login request sent by a user terminal, wherein the login request comprises the first login password; and responding to the login request, and sending data information of the first account binding with the first login password to the user terminal, to make the user terminal display the data information;

wherein the step of binding the first login password to the first account corresponding to the post comprises:

determining whether the post is a new post according to the identification of the post;

if the post is a new post, creating the first account corresponding to the post, and binding the first login password to the first account corresponding to the post;

if the post is not a new post, enter in the step of binding the first login password to the first account directly;

wherein the identity recognition method further comprises: sending at least two items of the identity of the first user, the identification of the post, the identification of the first account corresponding to the post to a user terminal corresponding to a second user; if the first user is a new user, enter in the step of sending at least two items of the identity of the first user, the identification of the post, the identification of the first account corresponding to the post to the user terminal corresponding to the second user directly.

2. The identity recognition method according to claim 1, wherein the identity recognition method further comprises:
sending share-data information of an associated account of the first account to the user terminal when receiving a read request, wherein the read request comprises an identification of the first account;
wherein the share-data information of the associated account of the first account comprises a document sent or received by the associated account and stored in a shared database automatically.

3. The identity recognition method according to claim 1, wherein the step of binding the first login password to the first account corresponding to the post further comprises:
binding the identity of the first user to the first account corresponding to the post;
wherein the identity recognition method further comprises:
determining whether the first user is a new user according to the identity of the first user;
if the first user is not a new user, finding an original account binding with the first user, and linking the first account corresponding to the post to a database corresponding to the original account.

4. The identity recognition method according to claim 3, wherein the identity recognition method further comprises:
receiving an unbind request, wherein the unbind request comprises an identity of a former user;
finding a second account binding to the former user according to the identity of the former user, and unbinding the second account to the former user.

5. An identity recognition method, wherein the identity recognition method is applied to a user terminal and a server, and the identity recognition method comprises:
the user terminal sending registration information of a first user, wherein the registration information comprises an identification of a post of the first user, an identity of the first user and a first login password;
the server binding the first login password to a first account corresponding to the post;
the user terminal sending a login request to the server, wherein the login request comprises the first login password;
the server responding to the login request, and sending data information of the first account binding with the first login password to the user terminal;
the user terminal displaying the data information;
wherein the step of the server binding the first login password to the first account corresponding to the post comprises:
determining whether the post is a new post according to the identification of the post;
if the post is a new post, creating the first account corresponding to the post, and binding the first login password to the first account corresponding to the post;
if the post is not a new post, enter in the step of binding the first login password to the first account directly;
wherein the identity recognition method further comprises: sending at least two items of the identity of the first user, the identification of the post, the identification of the first account corresponding to the post to a user terminal corresponding to a second user; if the first user is a new user, enter in the step of sending at least two items of the identity of the first user, the identification of the post, the identification of the first account corresponding to the post to the user terminal corresponding to the second user directly.

6. The identity recognition method according to claim 5, wherein the step the server binding the first login password to the first account corresponding to the post comprises:
determining whether the post is a new post according to the identification of the post;
if the post is a new post, creating the first account corresponding to the post, and binding the first login password to the first account;
if the post is not a new post, enter in the step of the server binding the first login password to the first account directly.

7. An identity recognition system, wherein the identity recognition system comprises a server, wherein the server comprises:
a processor; and
a memory communicatively coupled to the processor and storing instructions that upon execution by the processor cause the server terminal to:
receiving registration information of a first user, wherein the registration information comprises an identification of a post of the first user, an identity of the first user and a first login password;
binding the first login password to a first account corresponding to the post;
receiving a login request sent by a user terminal, wherein the login request comprises the first login password; and
responding to the login request, and sending data information of the first account binding with the first login password to the user terminal, to make the user terminal display the data information;
wherein the step of binding the first login password to the first account corresponding to the post comprises:
determining whether the post is a new post according to the identification of the post;
if the post is a new post, creating the first account corresponding to the post, and binding the first login password to the first account corresponding to the post;
if the post is not a new post, enter in the step of binding the first login password to the first account directly;
wherein the identity recognition method further comprises: sending at least two items of the identity of the first user, the identification of the post, the identification of the first account corresponding to the post to a user terminal corresponding to a second user; if the first user is a new user, enter in the step of sending at least two items of the identity of the first user, the identification of the post, the identification of the first account corresponding to the post to the user terminal corresponding to the second user directly.

8. A server, wherein the server comprises:
a processor; and
a memory communicatively coupled to the processor and storing instructions that upon execution by the processor cause the server terminal to:
receiving registration information of a first user, wherein the registration information comprises an identification of a post of the first user, an identity of the first user and a first login password;
binding the first login password to a first account corresponding to the post;

receiving a login request sent by a user terminal, wherein the login request comprises the first login password; and responding to the login request, and sending data information of the first account binding with the first login password to the user terminal, to make the user terminal display the data information;

wherein the step of binding the first login password to the first account corresponding to the post comprises:

determining whether the post is a new post according to the identification of the post;

if the post is a new post, creating the first account corresponding to the post, and binding the first login password to the first account corresponding to the post;

if the post is not a new post, enter in the step of binding the first login password to the first account directly; wherein the identity recognition method further comprises: sending at least two items of the identity of the first user, the identification of the post, the identification of the first account corresponding to the post to a user terminal corresponding to a second user; if the first user is a new user, enter in the step of sending at least two items of the identity of the first user, the identification of the post, the identification of the first account corresponding to the post to the user terminal corresponding to the second user directly.

* * * * *